United States Patent Office 3,822,175
Patented July 2, 1974

3,822,175
BONDABLE ADHESIVE COATED POLYIMIDE
FILM AND LAMINATES
Edward L. Yuan, Philadelphia, Pa., assignor to E. I. du
Pont de Nemours and Company, Wilmington, Del.
No Drawing. Original application July 12, 1971, Ser. No.
161,871, now Patent No. 3,728,150. Divided and this
application Feb. 9, 1973, Ser. No. 331,209
Int. Cl. B44d 1/00
U.S. Cl. 161—93     11 Claims

ABSTRACT OF THE DISCLOSURE

Caustic treated polyimide film coating with an acrylic adhesive and laminate articles made therefrom.

This is a division of application Ser. No. 161,871, filed July 12, 1971 now U.S. Pat. No. 3,728,150.

BACKGROUND OF THE INVENTION

It is well known in the art that many adhesive compositions do not bond well to various types of polyimide film. In order to improve adhesion, various types of surface treatments have been used on the film with varying degrees of success. Generally, the adhesive coated film does not possess acceptable adhesiveness to be used in commercial situations to bond the film to various types of substrates such as metals and the like.

SUMMARY OF THE INVENTION

This invention relates to polyimide film treated with a caustic solution and coated with an acrylic adhesive. This adhesive coated film possesses superior bonding properties to various substrates such as metals.

These polyimide films are characterised by the recurring unit

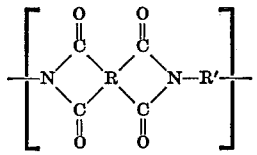

wherein R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical; and wherein R' is a divalent radical containing at least two rings of six carbon atoms, each ring characterized by benzenoid unsaturation, and in which no more than one of the valence bonds is located on any one of said rings of said R' radical.

An acrylic adhesive composition is applied to the polyimide film which had been treated with a caustic solution to produce an adhesive coated film capable of being bonded to substrates such as metal foils and the like.

DESCRIPTION OF THE INVENTION

This invention particularly relates to acrylic adhesive coated polyimide films. The polyimide film was treated with a caustic solution prior to the application of the adhesive composition in order to surface treat the film and thereby enhance adhesion.

Polyimides suitable for use as films in this invention are disclosed in Edwards, U.S. Pat. 3,179,634, issued Apr. 20, 1965, the disclosure of which is hereby incorporated by reference. These polyimides are characterized by the following recurring structural formulas:

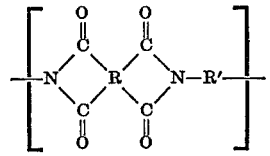

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

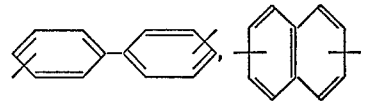

and

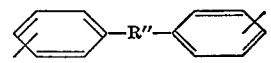

wherein R'' is selected from the group consisting of an alkylene chain having 1–3 carbon atoms,

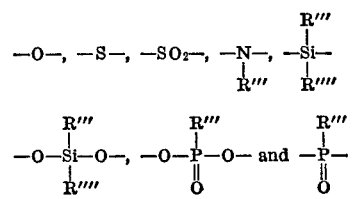

where R''' and R'''' are selected from the group consisting of alkyl and aryl.

These polyimides display outstanding physical and chemical properties which make them very useful as shaped structures such as self-supporting films and the like. The structures are characterized by high tensile properties, desirable electric properties and surprising stability to heat and water.

The polyimides are prepared by reacting at least one organic diamine having the structural formula $$H_2N—R'—NH_2$$

wherein R' is a divalent benzenoid radical selected from the group consisting of

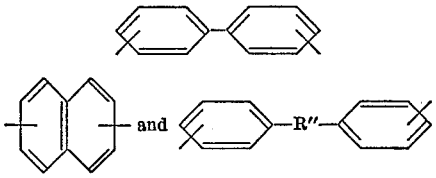

wherein R'' is selected from the group consisting of an alkylene chain having 1–3 carbon atoms,

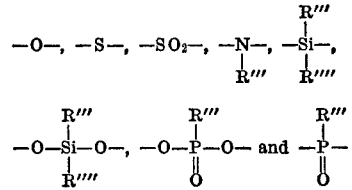

wherein R''' and R'''' are selected from the group consisting of alkyl and aryl, with at least one tetracarboxylic acid dianhydride having the structural formula

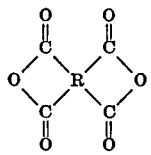

wherein R is a tetravalent aromatic organic radical, preferably containing at least one ring of six carbon atoms, said ring characterized by benzenoid unsaturation, the four carbonyl groups being attached directly to separate carbon atoms in a ring and carbon atoms of each pair of carbonyl groups being attached to adjacent carbon atoms in a ring of the radical.

The diamine and the dianhydride may be reacted directly. Alternatively, the dianhydride may first be reacted with a mono-functional alcohol (ethanol) to form a monomeric diester-diacid which is then reacted with the diamine. As a third alternative, any combination of the foregoing two techniques may be used. In all of these techniques melt polymerization is performed under such conditions to form the polyimide directly.

The starting materials for forming these polyimides are specific organic diamines and tetracarboxylic acid dianhydrides. The organic diamines are characterized by the formula $H_2NR'—NH_2$ wherein $R'$ is a divalent benzenoid radical selected from the group consisting of

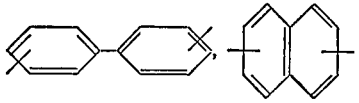

and

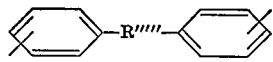

wherein R''''' is a divalent isoelectronic configuration comprising elements from Rows IVa, Va and VIa of the Periodic Table having an atomic weight of 12–33. Among the diamines which are suitable for use in the present invention are:

4,4'-diaminodiphenyl propane,
4,4'-diamino-diphenyl methane,
benzidine,
3,3'-dichlorobenzidine,
4,4'-diamino-diphenyl sulfide,
3,3'-diaminodiphenyl sulfone,
4,4'-diamino-diphenyl sulfone,
4,4'-diamino-diphenyl ether,
1,5-diamino naphthalene,
4,4'-diamino-diphenyl diethylsilane,
4,4'-diamino-diphenyl diphenylsilane,
4,4'-diamino-diphenyl ethyl phosphine oxide,
4,4'-diamino-diphenyl phenyl phosphine oxide,
4,4'-diamino-diphenyl N-methyl amine,
4,4'-diamino-diphenyl N-phenyl amine and mixtures thereof.

Thhe tetracarboxylic acid dianhydrides are characterized by the following formula:

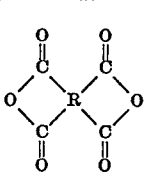

wherein R is a tetravalent organic radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

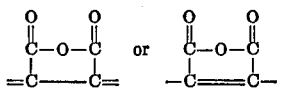

Illustrations of dianhydrides suitable for use in the present invention include:

pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl) propane dianhydride,
bis(3,4-dicarboxyphenyl) sulfone dianhydride,
perylene 3,4,9,10-tetracarboxylic acid dianhydride,
bis(3,4-dicarboxyphenyl) ether dianhydride,
naphthalene-1,2,4,5-tetracarboxylic dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
bis(2,3-dicarboxyphenyl) methane dianhydride,
bis(4,5-dicarboxyphenyl) methane dianhydride,
benzene-1,2,3,4-tetracarboxylic dianhydride,
pyrazine-2,3,5,6-tetracarboxylic dianhydride,
thiophene-2,3,4,5-tetracarboxylic dianhydride,
3,4,3',4'-benzophenone tetracarboxylic dianhydride,
etc.

The solvents useful in the solution polymerization process for synthesizing the intermediate polyamide-acid compositions in the preferred process of preparing the polyimides are the organic solvents whose functional groups do not react with either of the reactants (the diamines or the dianhydrides) to any appreciable extent. Besides being inert to the system and preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydride groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion.

Other typical compounds of this useful class of solvents are:

N,N-diethylformamide,
N,N-diethylacetamide,
N,N-dimethylmethoxy acetamide,
N-methyl caprolactam, etc.

Other solvents which may be used in the present invention are:

dimethylsulfoxide,
N-methyl-2-pyrrolidone,
tetramethylene urea,
pyridine,
dimethylsulfone,
hexamethylphosphoramide,
tetramethylene sulfone,
formamide,
N-methylformamide,
butyrolactone and
N-acetyl-2-pyrrolidone.

The solvents can be used alone, in combinations of solvents, or in combination with poor solvents such as benzene, benzonitrile, dioxane, xylene, toluene and cyclohexane.

These polyimide films may be treated with a basic compound in accordance with the process disclosed in Lindsey, U.S. Pat. 3,361,589, issued Jan. 2, 1968, the disclosure of which is hereby incorporated by reference. These basic compounds can be the following: a carbonate, hydroxide, cyanide, borate, phosphate, pyrophosphate, sulfite, sulfide or silicate of an alkali metal including sodium, potassium, lithium, rubidium and cesium; a carbonate, hydroxide, cyanide, borate or sulfide of ammonia; an alkoxide of an alkali metal; and quaternary ammonium hydroxides.

The basic compounds can be used in anhydrous form or in the form of any convenient hydrate as will be readily understood and as illustrated below:

The alkoxides referred to will generally have from 1 through 12 carbons in the alkylate portion.

The quaternary ammonium hydroxides have the formula:

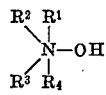

where $R^1$ and $R^2$ are the same or different alkyl radicals of 1 through 4 carbons; $R^3$ is alkyl of 1 through 18 carbons or alkenyl of 1 through 18 carbons; $R^4$ is alkyl of 1 through 18 carbons, alkenyl of 1 through 18 carbons, phenyl, alkylphenyl where the akyl portion has 1 through 18 carbons, benzyl or alkylbenzyl where the alkyl portion has 1 through 18 carbons.

Representative quaternary ammonium hydroxides which are useful are the following:

tetramethyl ammonium hydroxide
tetraethyl ammonium hydroxide
tetrabutyl ammonium hydroxide
benzyl trimethyl ammonium hydroxide
phenyl trimethyl ammonium hydroxide
dodecyl triethyl ammonium hydroxide
hexadecyl triethyl ammonium hydroxide
octadecyl trimethyl ammonium hydroxide
dodecyl trimethyl ammonium hydroxide
hexadecyl trimethyl ammonium hydroxide
octadecyl triethyl ammonium hydroxide
dodecyl tri-n-propyl ammonium hydroxide
dodecyl tri-isopropyl ammonium hydroxide
benzyl dimethyl hexadecyl ammonium hydroxide
dimethyl ethyl hexadecyl ammonium hydroxide
p-dodecylbenzyl trimethyl ammonium hydroxide
benzyl dimethyl octadecyl ammonium hydroxide Commercially available products containing mixtures of two or more quaternary ammonium hydroxides, usually of higher alkyl and/or alkenyl substituents are particularly useful. Representative of such mixtures are the following wherein only the alkyl or alkenyl substituents are noted and the percent by weight of each component is also given:

(1) 90% dodecyl, 9% tetradecyl and 1% octadecenyl;
(2) 90% tetradecyl, 4% dodecyl, 4% hexadecyl and 2% octadecenyl;
(3) 90% hexadecyl, 6% octadecyl and 4% octadecenyl;
(4) 93% octadecyl, 6% hexadecyl and 1% octadecenyl; and
(5) 47% dodecyl, 18% tetradecyl, 9% decyl, 8% octyl, 8% hexadecyl, 5% octadecyl, 3% octadecenyl and 2% octadecadienyl.

Preferred bases are sodium hydroxide, potassium hydroxide, lithium hydroxide and ammonium hydroxide.

The basic treating agent is applied in a solution, preferably in water and/or an alcohol, to the surface of the polyimide. The solution for the basic compounds such as referred to above generally will be aqueous and will have a pH of at least about 10. Alcoholic solutions of the alkali metal alkoxides, such as sodium dodecoxide (sodium dodecylate), in lower alcohols, such as alkanols of 1 through 4 carbons, e.g. methanol, ethanol, etc., are satisfactory. The concentration of the solution can be from about 5 to 30% by weight of the basic treating agent.

Duration of treatment can vary from as short as about 10 seconds or so up to half an hour or longer and temperatures in the range of about 20 to 100° C. are usable. Selection of the particular concentration, duration and temperature to be used for any given basic treating agent and any given polyimide will be interdependent and readily determinable by persons skilled in the art.

Treatment generally will be sufficient to provide on the polyimide surface free carboxyl groups in an amount that can be detected by potentiometric titration with a weak alkali. No more is needed than an amount sufficient to wet the surface to be treated or, in other words, an amount sufficient to obtain a surface which can be wetted uniformly by water. The resultant treated surface has an extremely thin surface coating of the sodium salt of the polyamide-acid as well as the polyamide-acid have improved adherability. The polyamide-acid as mentioned above is of sufficient amount to be detectable by titration with a strong alkali, but insufficient to be detectable by feel or by single reflection attenuated total reflectance infrared spectroscopy using an optical prism in contact with the treated surface, the prism having an index of refraction below about 2.6. A suitable prism is available commercially and is the KRS–5 prism of fixed 45% by weight thallium bromide and 52% by weight thallium iodide (Harshaw Chemical Co.)

Following treatment using relatively moderate conditions, i.e. dilute treating solution, short time and/or low temperature, no visible change will be seen in the treated surface even though there definitely is a measurable improvement in adherability. On the other hand, with increasing severity of treatment, i.e. more concentrated treating solution, longer time and/or higher temperature, the treated surface may lose its glossiness and acquire the appearance of having been sanded. The treatment does not to any significant extent adversely affect the outstanding physical properties of the material such as the tensile strength, modulus, elongation, impact strength, tear strength, and the like.

An acrylic adhesive composition can be applied to the treated polyimide film by conventional application procedures such as spraying, dipping, brushing, roll coating, and the like.

This acrylic adhesive composition should be a terpolymer of 15–50% by weight of the polymer of acrylonitrile, methacrylonitrile or mixtures thereof, 84–45% by weight of butyl acrylate, ethyl acrylate, 2-ethylhexyl acrylate, lauryl acrylate or mixtures thereof, and 1–5% by weight of methacrylic acid, acrylic acid, itaconic acid or mixtures thereof. Also included should be a crosslinking resin such as melamine formaldehyde, phenol formaldehyde, or melamines such as hexamethoxymethyl melamine and the like. These crosslinkers can be present in an amount of about 1–10% by weight of terpolymer. A preferred adhesive composition uses a copolymer of acrylonitrile/butyl acrylate/methacrylic acid in about a 35/60/5 ratio by weight mixed with 5% phenol formaldehyde by weight.

This adhesive composition can be applied in varying thicknesses dependent on the particular end use of the coated film. Greater adhesive thickness can be achieved by a plurality of coats. The adhesive coated polyimide films can be used to form various types of laminate articles and can be used in combination with various external layers of metal foils such as copper, aluminum, nickel, and the like to yield particularly useful circuit boards. Standard lamination procedures are used to construct these laminates such as vacuum bag lamination, press lamination, roll lamination and the like.

UTILITY

The acrylic adhesive coated polyamide films of this invention have particular utility in various types of laminated articles and show particularly good adhesive qualities. Exceptional results are obtained where circuit boards are constructed by laminating various types of metal foils especially copper to a plurality of layers of the coated polyimide film.

These adhesive coated films exhibit good adhesive qualities when laminated to various types of substrates. Illustrative of such substrates are glass fabrics, metal foils, Nomex® nylon paper, polymeric and natural fabrics and the like.

Example 1

(1) A 1.0 mil Kapton® polyimide film was immersed in a 10% NaOH solution in H$_2$O for 30 seconds at room temperature. The film was then removed from the caustic solution and rinsed in H$_2$O for 1 minute and subsequently dried.

(2) The dried film of (1) was dipped into a 35% solids dispersion of a 35/60/5 ratio by weight of acrylonitrile/butyl acrylate/methacrylic acid terpolymer respectively with an additional 5% of phenol formaldehyde resin by weight of the terpolymer dispersion.

(3) A No. 40 wire-wound rod was drawn down the dipped film to remove excess resin and the film then dried at 110° C. for 15 minutes. After drying, the terpolymer coating is about 0.5 mil thick and is tack free.

(4) The film of (3) was sandwiched between 2 sheets of 1 oz. treated copper (treatment "A"). This sandwich construction was press laminated at 400° C., 400 p.s.i. for 15 minutes.

This produced a copper clad laminate having an adhesive strength of copper to Kapton® of in excess of 6 lbs./in. This laminate can be immersed in a solder bath at 500° F. for over 1 minute without blistering.

Example 2

The procedure of Example 1 was followed to obtain an acrylic treated Kapton® film except that a No. 50 wire-wound rod was used to draw down the excess acrylic resin in step (3) which was applied to the film by two dipping operations instead of one. This produced an acrylic adhesive coating 1.8 ml thick in each side of the Kapton® film.

A multi-layered circuit board was prepared by press laminating at 400° F., 400 p.s.i. for 15 minutes the adhesive coated Kapton® film between 2 copper clad laminates such as were produced in Example 1 on which circuit had been etched. This produced an excellent multi layered circuit board with a low void content.

Example 3

The procedure of Example 1 was followed except that the polymer in the acrylic resin used was a 20/75/5 ratio by weight of acrylonitrile/ethyl acrylate/methacrylic acid respectively with 5% hexamethoxymethyl melamine resin added by weight of acrylic resin. This produced copper clad laminate having excellent adhesive properties.

Example 4

(1) A 1.0 mil Kapton® film was immersed in a 10% NaOH solution in H$_2$O for 30 seconds at room temperature. The film was then removed from the caustic solution and rinsed in H$_2$O for 1 minute and subsequently dried.

(2) The dried film of (1) was dipped into a 35% solids dispersion of a 35/60/5 ratio by weight of acrylonitrile/butyl acrylate/methacrylic acid terpolymer respectively with an additional 5% of phenol formaldehyde resin by weight of the terpolymer dispersion.

(3) A No. 40 wire-wound rod was drawn down the dipped film to remove excess resin and the film then dried at 110° C. for 15 minutes.

(4) The procedure of (2) and (3) was repeated while protecting one side of the film from receiving any additional adhesive. The film was then dried at 110° C. for 15 minutes. After drying, the adhesive coating is 0.5 mil on one side of the Kapton® film and 1.0 mil on the other side.

(5) The film of (4) was then laminated to copper and glass using the following layout: A No. 108 glass cloth core sandwiched between the Kapton® film of (4) with the side having the 1.0 mil adhesive in intimate contact with the glass and as an outer layer, a 1 oz. treated copper sheet (treatment A) in intimate adherence to the 0.5 mil side of the Kapton®. The lamination conditions were 400° F. for 15 minutes at 400 p.s.i.

This produced a laminate structure having excellent physical properties.

What is claimed is:

1. Laminate comprising at least one substrate adhered to at least one acrylic adhesive coated polyimide film, said polyimide film having the recurring unit:

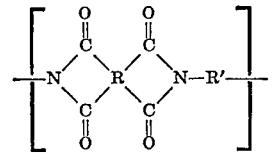

wherein R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical; and wherein R' is a divalent radical containing at least two rings of six carbon atoms, each ring characterized by benzenoid unsaturation, and in which no more than one of the valence bonds is located on any one of said rings of said R' radical, said polyimide film having been treated by applying to the surface of the film to be coated, in an amount and for a time sufficient to improve the receptivity and adherability of said surface to adhesives and at a temperature in the range of about 20 to 100° C., an aqueous solution of about 5 to 30% by weight of a basic compound selected from the group consisting of a carbonate, hydroxide, cyanide, borate, phosphate, pyrophosphate, sulfite, sulfide and silicate of an alkali metal; a carbonate, hydroxide, cyanide, borate and sulfide of ammonia; alkali metal alkoxides where the alkylate portion has 1 through 4 carbons, and a quaternary ammonium hydroxide of the formula

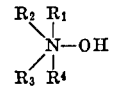

where $R^1$ and $R^2$ are each alkyl of 1–4 carbons; $R^3$ is selected from the group consisting of alkyl of 1–18 carbons and alkenyl of 1–18 carbons; and $R^4$ is selected from the group consisting of alkyl of 1–18 carbons, alkenyl of 1–18 carbons, phenyl, alkylphenyl where the alkyl portion has 1–18 carbons, benzyl and alkylbenzyl where the alkyl portion has 1–18 carbons, said acrylic adhesive consisting essentially of (a) a terpolymer of 15–50% by weight, based on the weight of the terpolymer, of acrylonitrile, methacrylonitrile, or mixtures thereof, and 84–45% by weight, based on the weight of the terpolymer, of butyl acrylate, ethyl acrylate, 2-ethylhexyl acrylate, lauryl acrylate, or mixtures thereof, and 1–5% by weight, based on the weight of the terpolymer, of methacrylic acid, acrylic acid, itaconic acid, or mixtures thereof, and (b) a cross-linking resin selected from the group consisting of phenol formaldehyde, melamine formaldehyde and hexamethoxymethyl melamine, said cross-linking resin being present in an amount of about 1–10% by weight of said trepolymer,
said substrate selected from the group consisting of metal, glass fabric, nylon paper, polymeric fabrics and natural fabrics.

2. The laminate of Claim 1 wherein the polyimide film has the recurring unit:

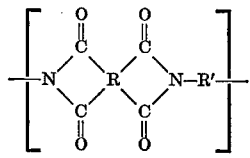

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

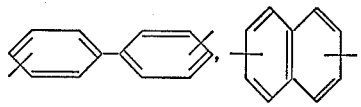

and

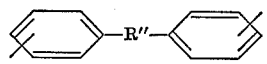

wherein R'' is selected from the group consisting of an alkylene chain having 1–3 carbon atoms,

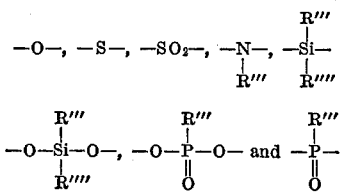

where R''' and R'''' are selected from the group consisting of alkyl and aryl, and the aqueous solution is an aqueous solution of potassium hydroxide, said solution having been applied to the polyimide film for a period of 10 seconds to 30 minutes, and wherein the acrylic adhesive consists essentially of (a) a terpolymer of acrylonitrile/butyl acrylate/methacrylic acid in a 35/60/5 ratio by weight respectively, and (b) 5% by weight, based on the weight of the terpolymer, of cross-linking resin.

3. The laminate or Claim 1 wherein the polyimide film has the recurring unit:

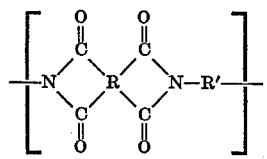

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

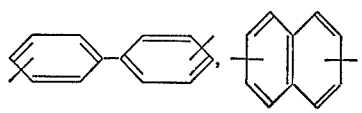

and

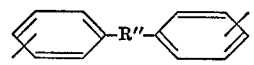

wherein R'' is selected from the group consisting of an alkylene chain having 1–3 carbon atoms,

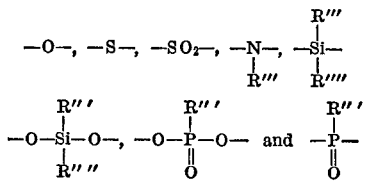

where R''' and R'''' are selected from the group consisting of alkyl and aryl, and the aqueous solution is an aqueous solution of potassium hydroxide, said solution having been applied to the polyimide film for a period of 10 seconds to 30 minutes, and wherein the acrylic adhesive consists essentially of (a) a terpolymer of acrylonitrile/butyl acrylate/methacrylic acid in a 35/60/5 ratio by weight respectively, and (b) 5% by weight, based on the weight of the terpolymer, of cross-linking resin.

4. The laminate of Claim 1 wherein the polyimide film has the recurring unit:

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of and wherein R'' is selected from the group consisting of an alkylene chain having 1–3 carbon atoms, where R''' and R'''' are selected from the group consisting of alkyl and aryl, and the aqueous solution is an aqueous solution of sodium hydroxide, said solution having been applied to the polyimide film for a period of 10 seconds to 30 minutes, and wherein the acrylic adhesive consists essentially of (a) a terpolymer of acrylonitrile/methacrylic acid in a 20/75/5 ratio by weight respectively, and (b) 5% by weight, based on the weight of the terpolymer, of cross-linking resin.

5. The laminate of Claim 1 wherein the polyimide film has the recurring unit:

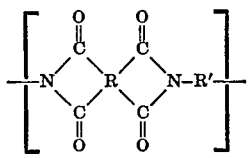

where R is a tetravalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

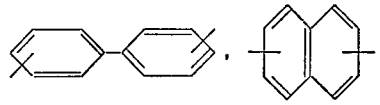

and

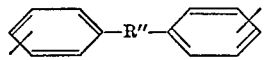

wherein R'' is selected from the group consisting of an alkylene chain having 1-3 carbon atoms,

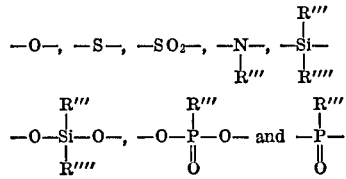

where R''' and R'''' are selected from the group consisting of alkyl and aryl, and the aqueous solution is an aqueous solution of potassium hydroxide, said solution having been applied to the polyimide film for a period of 10 seconds to 30 minutes, and wherein the acrylic adhesive consists essentially of (a) a terpolymer of acrylonitrile/ethyl acrylate/methacrylic acid in a 20/75/5 ratio by weight respectively, and (b) 5% by weight, based on the weight of the terpolymer, of cross-linking resin.

6. The laminate of Claim 2 wherein the polyimide film is a polyimide of an aromatic tetracarboxylic acid dianhydride wherein all four carboxyl groups of said dianhydride are directly attached to an aromatic ring of said dianhydride and an aromatic diamine having the formula $$NH_2—R'—NH_2$$

wherein R' is a divalent benzenoid radical selected from the group consisting of

and

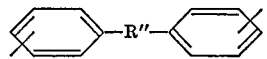

wherein R'' is selected from the group consisting of an alkylene chain having 1-3 carbon atoms,

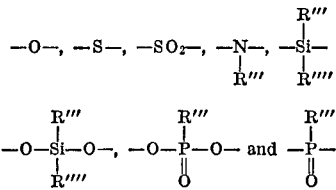

7. The laminate of Claim 3 wherein the polyimide film is a polyimide of an aromatic tetracarboxylic acid dianhydride wherein all four carboxyl groups of said dianhydride are directly attached to an aromatic ring of said dianhydride and an aromatic diamine having the formula $$NH_2—R'—NH_2$$

wherein R' is a divalent benzenoid radical selected from the group consisting of

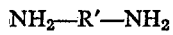

and

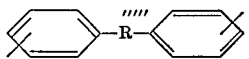

wherein R''''' is selected from the group consisting of an alkylene chain having 1-3 carbon atoms,

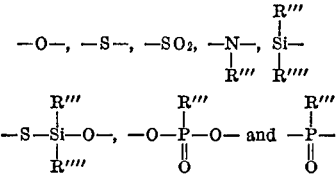

8. The laminate of Claim 1 wherein the substrate is selected from the group consisting of metal foil and glass fabric.

9. The laminate of Claim 1 wherein the substrate is selected from the group consisting of copper foil and glass fabric.

10. The laminate of Claim 1 wherein the laminate consists of the acrylic adhesive coated polyimide film having copper foil adhered to one side and glass fabric adhered to the other.

11. The laminate of Claim 1 wherein the laminate consists of the acrylic adhesive coated polyimide film having copper foil or glass fabric adhered to one or both sides.

References Cited
UNITED STATES PATENTS

| | | | |
|---|---|---|---|
| 3,179,633 | 4/1965 | Endrey | 117—138.8 A |
| 3,179,634 | 4/1965 | Edwards | 161—227 |
| 3,242,136 | 3/1966 | Endrey | 117—138.8 A |
| 3,361,589 | 1/1968 | Lindsey | 161—227 |
| 3,717,543 | 2/1973 | Sinclair et al. | 161—227 |

GEORGE F. LESMES, Primary Examiner

C. E. LIPSEY, Assistant Examiner

U.S. Cl. X.R.

117—138.8 A; 161—204, 218, 227, 247, 251, 256; 260—78 R, 844, 851